United States Patent Office 3,071,092
Patented Jan. 1, 1963

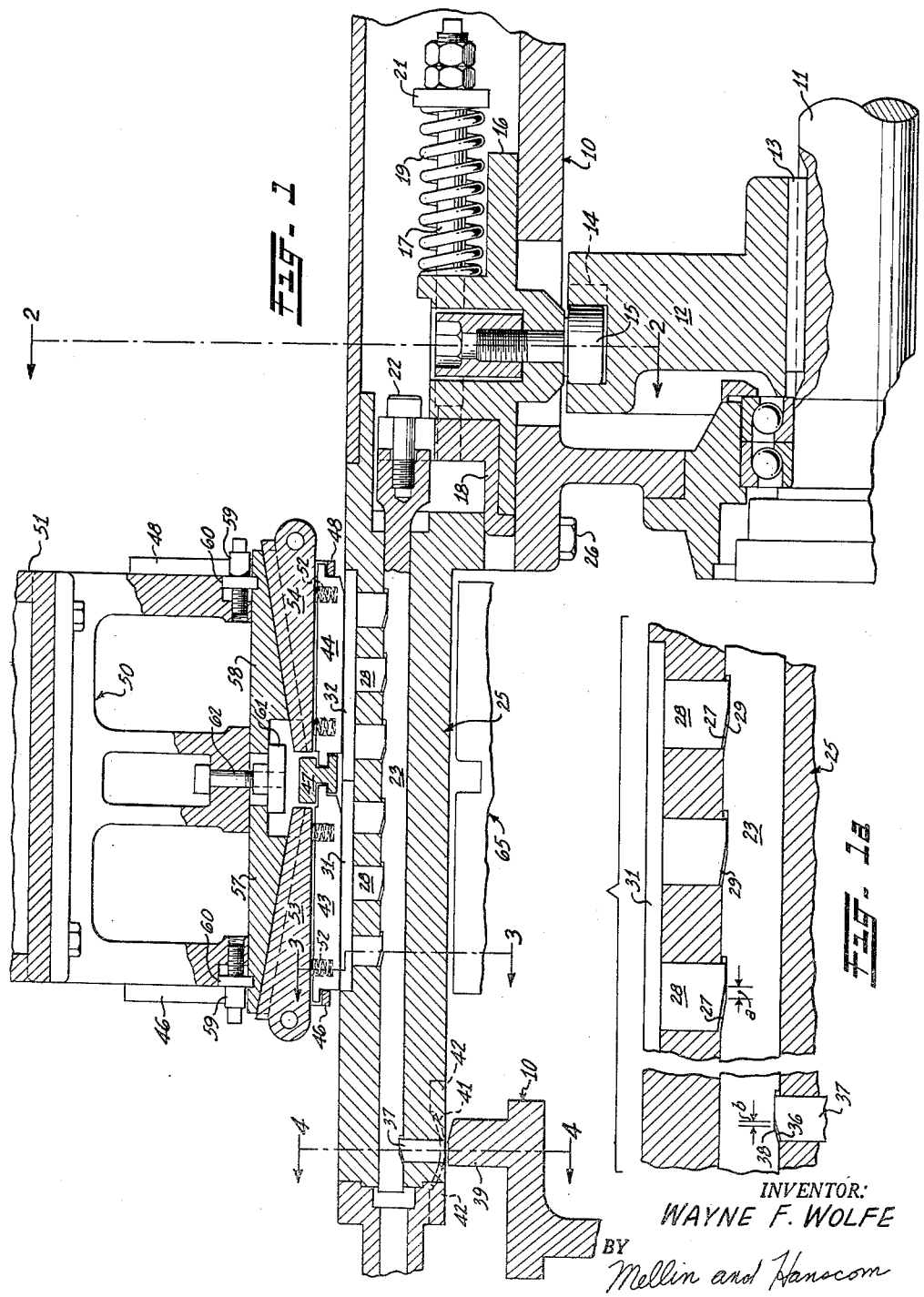

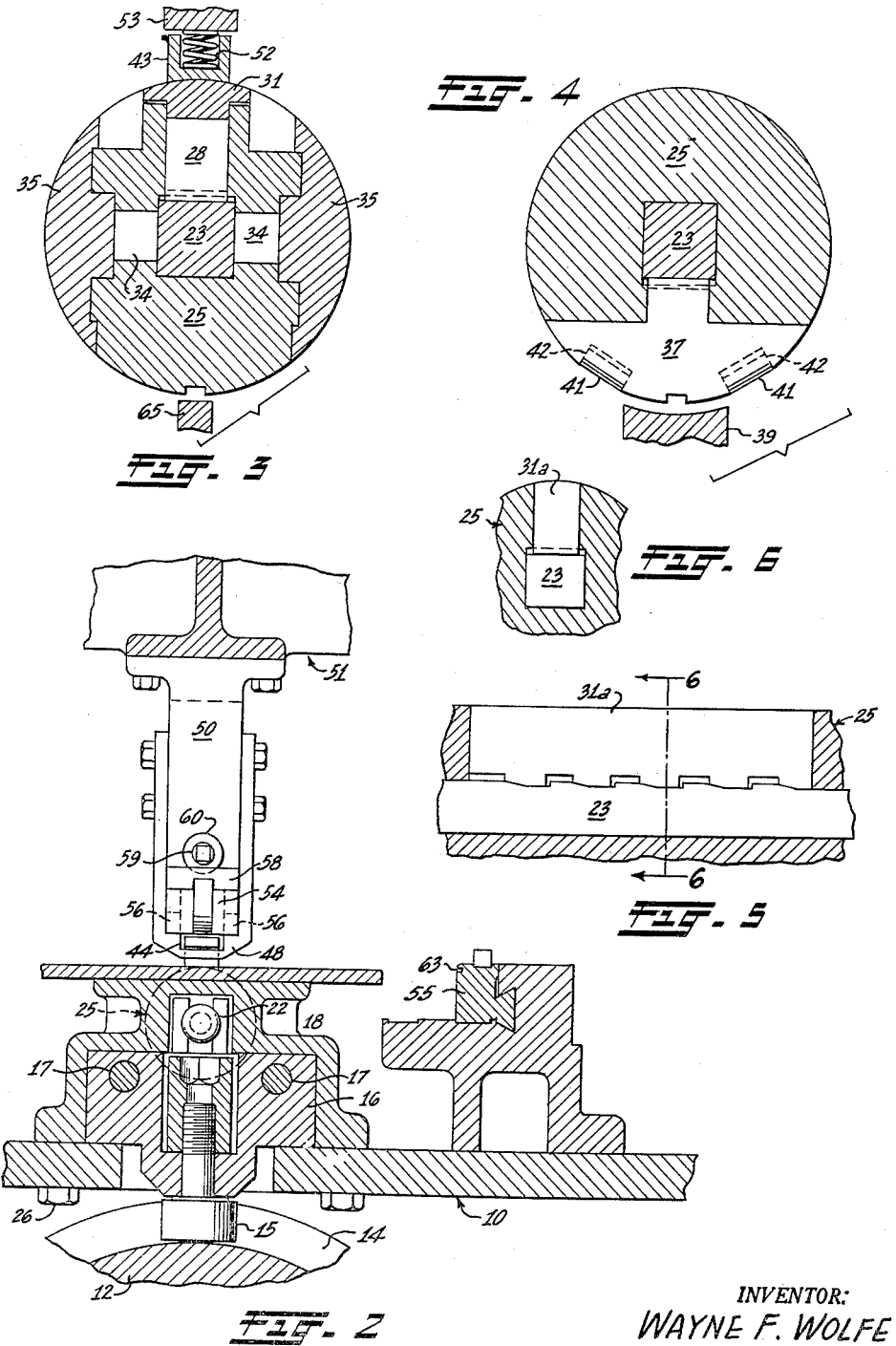

3,071,092
FORMING HORN SUPPORT
Wayne F. Wolfe, Castro Valley, Calif., assignor to Hunt Foods and Industries, Inc., Fullerton, Calif., a corporation of Delaware
Filed Aug. 8, 1960, Ser. No. 48,134
5 Claims. (Cl. 113—8)

This invention relates to can body making machines and more particularly to apparatus for supporting the forming horns of such machines against flexure during the operation of such machines.

In general, can body making machines operate on flat rectangular can blanks to notch the corners and fold the side edges of the can blanks into opposed hooks. The flat blanks are next positioned on a cylindrical forming horn and are clamped thereto. Forming wings then wrap the blanks around the horn so as to overlap the oppositely hooked edges. The horn is expanded slightly to a desired size and is pressed firmly against the inside of the can bodies and the overlapped edges are struck to clench the can seams tightly. The forming horn is retracted and the now cylindrical can bodies are moved longitudinally from the forming horn to a soldering station wherein the clenched seam is soldered. A can body making machine operating as described above is illustrated and fully described in my copending application entitled "Can Body Making Machine," Serial No. 681,227, filed August 30, 1957.

As is obvious, the forming horn must be mounted in cantilever fashion to the frame of the machine so that it is possible to slide the formed can bodies therefrom after the hooked edges are clenched together. Being supported only at one end thereof, the forming horn will flex somewhat under the force applied thereto when the can body blanks are first clamped thereagainst, with the highly disadvantageous result that the formed can bodies will not be truly cylindrical. In can body making machines having forming horns designed to operate on only one can body blank at a time the relatively short length of the horn may be such that the flexure will be so slight that the untrueness of the formed cans will be unnoticeable. However, in machines having forming horns designed to have two can body blanks operated upon simultaneously, as in my application referred to above, the curvature of the clamped horn will be such that the formed cans will be objectionably out of true.

It is a primary object of this invention then, to provide means for supporting the free end of the forming horn during the clamping, forming and clenching operations so that there will be no undue flexure of the forming horn during such operation.

Another object of the invention is to provide a forming horn having radially expandable members for clamping a can blank to said horn and for supporting the free end of said horn and to provide an operator disposed internally of said horn for operating the radially movable members.

Yet another object of the invention is to provide a forming horn apparatus operable in automatic can body making machines to support the free end of the forming horn during the portion of a cycle of operation wherein a can blank is clamped to and wrapped around said horn and wherein the interlocked seam is clenched and in which the support for the free end of the forming horn is retracted into the forming horn during the remainder of the cycle so that the formed, cylindrical can bodies can be stripped from the free end of the forming horn.

Other objects and advantages will become apparent in the course of the following detailed description.

In the drawings forming a part of this application and in which like parts are designated by like reference numerals throughout the same, FIG. 1 is a longitudinal sectional view of a can body making machine having a forming horn embodying the principles of the invention, with parts shown in elevation.

FIG. 1A is an enlarged detail view of FIG. 1 illustrating the manner in which the desired sequence of operation is obtained.

FIG. 2 is a transverse sectional view of the machine shown in FIG. 1, taken on line 2—2 thereof.

FIGS. 3 and 4 are transverse sections of the forming horn, taken on lines 3—3 and 4—4 of FIG. 1, respectively.

FIG. 5 illustrates a modification of the clamp cheek in the forming horn.

FIG. 6 is a sectional view of the modification of FIG. 5, taken on line 6—6 thereof.

Referring now to the drawings wherein a preferred embodiment of the invention is illustrated, the can body machine comprises a frame 10 having a power driven cam shaft 11 journaled therein. Barrel cam 12, keyed to shaft 11 by key 13, has a cam track 14 on the outer periphery thereof to receive cam follower roller 15 which depends downwardly from slide 16. Two bolts 17 extend freely through slide 16 and are screwed into overslide member 18. Springs 19 surround the free end of bolts 17, and are compressed between slide 16 and spring retainers 21 so that the slide 16 and overslide member 18 will normally move as a unit.

The overslide member 18 is connected by screw 22 to cam rod 23 disposed axially in forming horn 25 for reciprocal movement. The forming horn is rigidly secured at its right end (as seen in FIG. 1) to frame 10, as by screws 26.

Cam rod 23 is square in cross-section to avoid any rotational tendencies in horn 25 and has a plurality of cam surfaces 27 in the upper surface thereof which slope downwardly and to the right, as seen in FIGS. 1 and 1A. Cam plugs 28, mounted for radial movement in horn 25 adjacent each cam surface 27, have cam surfaces 29 on the bottom thereof complementary in slope to the cam rod cam surfaces 27. Two clamp cheeks 31 and 32 are disposed in horn 25 for outward movement by cam plugs 28 as cam rod 23 is moved to the right. As may be noted in the drawings, the upper surface of clamp cheeks 31 and 32 conform to the curvature of horn 25.

Both side surfaces of cam rod 23 have cam surfaces (not shown) formed therein which are similar to cam surfaces 27 and which cam plugs 34 to cam the expander cheeks 35 outwardly upon movement of cam rod 23 to the right, as is conventional in such apparatus.

The cam rod 23 has a similar cam surface 36 formed in the bottom surface of the rod at the free end of horn 25. A cam plug 37, disposed in the horn for radial movement, has a cam surface 38 thereon complementary in slope to cam rod surface 36. The lower surface of cam plug 37 has the same curvature as horn 25 and is adapted to engage the complementary shaped horn support member 39 when the cam plug is forced downwardly by cam rod 23. Two leaf springs 41 held in place by lugs 42 bias the cam plug 37 upwardly into the forming horn. The horn support member 39 is formed integrally with or rigidly secured to frame 10.

As will be noted in FIG. 1A, the longitudinal distance "$a$" that the cam rod 23 will travel to the right before the clamp cheek cam plug cam surfaces 29 are engaged by cam rod cam surface 27 is less than the distance "$b$" that the cam rod will travel before the cam rod cam surface 36 engages cam plug cam surface 38. This difference in spacing causes the cam plug 37 to move downwardly into engagement with horn support member 39 before the clamp cheeks 31 and 32 move upwardly to their furthest point of travel.

The clamp cheeks 31 and 32 are each adapted to clamp a can blank against anvil steels 43 and 44, respectively. These anvil steels are mounted loosely in fixed support members 46, 47 and 48, which locate the anvil steels and prevent longitudinal movement thereof while yet allowing slight vertical movement thereof. The support members are secured at their upper ends to anvil 50 which is rigidly secured to frame arch 51.

Springs 52, confined between anvil steels 43 and 44 and backup wedges 53 and 54, press the anvil steels against clamp cheeks 31 and 32 with sufficient pressure to slow down and control can body blanks when they are brought into position by the reciprocating feed bars 55. Backup wedges 53 and 54 are free to move vertically, but are restrained against endwise movement by the engagement of shoulders 56 on support members 46 and 47 in the vertical grooves of the backup wedges.

Adjusting wedges 57 and 58 are disposed between the backup wedges 53 and 54 to control the amount of the total gap between the forming horn 25 and the anvil 50. Wedge 58 may be adjusted by rotating the screw 59 which is threaded into the anvil. As the screw rotates, the flange 60 thereon forces adjusting wedge 58 to move lengthwise. After the adjusting wedges have been set to a desired gap, clamp 61 is tightened by screw 62.

*Operation*

The above described apparatus has been designed for use with a can body making machine which operates through a complete cycle for each full revolution of the main cam shaft, and in turn the present apparatus operates through a full cycle for each full rotation of barrel cam 12.

To start a cycle, the feed bars 55 (FIG. 2) grip the hooked side edges of two can blanks in the feed bar grooves 63 and advance these can blanks by mechanism not shown but operated by cam shaft 11 so that one blank is inserted between each clamp cheek 31 and 32 and the spring-pressed anvil steels associated therewith.

The barrel cam 12 has now rotated so that the cam track thereon forces cam follower 15, slide 16, overslide 18 and cam rod 23 to the right, causing the cam plug 37 to move down into engagement with the horn support 39. Further movement of cam rod 23 forces clamp cheeks 31 and 32 upwardly, moving the anvil steels 43 and 44 upwardly to take up the gap between the anvil steels and the backup wedges and to clamp the can body blanks rigidly. After the cam plugs 28 reach their highest position, a slight further movement of cam rod 23 will lock the cam plugs in such highest position since neither of the now engaging portions of the cam plugs and cam rod are inclined.

After this clamping, the cam track 14 on the barrel cam 12 is designed for a period of dwell of cam follower 15 wherein no longitudinal movement of the cam rod 23 is produced. During this time, the can body blanks are wrapped around the forming horn by forming wings (not shown) and the oppositely hooked edge of the can blanks are locked together in a known manner.

The barrel cam 12 now moves cam rod 23 further to the right, moving cam plugs 34 and expander cheeks 35 outwardly to size the cans. Suitable mechanism forces the bumper bar 65 upwardly to strike the hooked can blank edges and clench the can seam.

Continued rotation of barrel cam 12 now forces the cam rod 23 to the left back to its original position, allowing the expander cheeks 35 to collapse, allowing the clamp cheeks 31 and 32 to retract and allowing leaf spring 41 to retract the cam plug 37. The clenched cans are now slid to the left on the forming horn by suitable mechanism (not shown) past the forming horn support 39 to complete the cycle. In actuality, the formed cans will be stripped from the forming horn at the same time that the next pair of can blanks is being moved into the forming horn.

In the event that some malfunction of the can body making machine causes two can blanks to enter in one location between a clamp cheek and its associated anvil steel, the outward movement of this clamp cheek and the cam plugs 28 will be restricted which in turn will prevent the cam rod 23 and overslide 18 from completing their rightward movement. However, there will be no damage to any of the machine elements because the springs 19 will allow the slide 16 to continue to move to the right even though the overslide 18 is not free to move therewith.

FIGS. 5 and 6 illustrate a modification of the invention wherein the clamp cheek 31 and separate cam plugs 28 are all formed into one unitary clamp cheek 31a which works directly against anvil steel 43 and cam rod 23.

Although the above disclosure has been directed to a can body making machine in which two can bodies are formed simultaneously on the forming horn 25, it is of course to be realized that the invention is not so limited but will also be of utility in a machine forming a single can body blank on the forming horn if there is any horn flexure problems.

It is of course to be further realized that the invention has been illustrated and described in connection with a preferred embodiment of the same, and that various changes can be made in the shape, size and arrangement of parts without departing from the spirit of the invention or the scope of the attached claims.

Having thus described my invention, what I claim and desire to secure by Letters Patent is:

1. In a can body making machine, a frame, a forming horn fixed at one end thereof to said frame, an anvil fixed to said frame and disposed adjacent said forming horn, a horn support fixed to said frame and spaced away from said one end of said horn and disposed adjacent said forming horn on the side thereof generally opposite to said anvil, a clamp cheek mounted in said forming horn for movement into and out of clamping engagement with said anvil, a horn support engaging member mounted in said forming horn for movement into and out of engagement with said horn support, and means movable in said forming horn for forcing said clamp cheek and said horn support engaging member outwardly into engagement with said anvil and horn support and for permitting inward movement of said clamp cheek and horn support engaging member.

2. In a can body making machine, a frame, a forming horn fixed at one end thereof to said frame, an anvil fixed to said frame and disposed adjacent said forming horn, a horn support fixed to said frame and spaced longitudinally from said one end of said horn and disposed adjacent said forming horn on the side thereof opposite to said anvil, a clamp cheek mounted in said forming horn for radial movement into and out of clamping engagement with said anvil, a horn support engaging member mounted in said forming horn for radial movement into and out of engagement with said horn support, a rod disposed longitudinally in said forming horn for reciprocal movement therein, cam surfaces on said rod adjacent said clamp cheek and said horn support engaging member, cam means engageable by said cam surfaces for forcing said clamp cheek and said horn support engaging member outwardly into engagement with said anvil and horn support when said rod is moved longitudinally in one direction thereof and for permitting inward movement of said clamp cheek and horn support engaging member when said rod is moved back in the opposite direction.

3. In a can body making machine as set forth in claim 2 wherein said cam surfaces are formed on said rod relatively to said cam means such that said horn support engaging member engages said horn support before said clamp cheek clampingly engages said anvil upon movement of said rod in said one direction.

4. In a can body making machine as set forth in claim 2 wherein said anvil comprises a stationary portion fixed to said frame and a movable portion disposed between said stationary portion and said clamp cheek, and means for resiliently pressing said movable portion against said clamp cheek, said movable portion being mounted for movement against said fixed portion by said clamp cheek upon movement of said cam rod in said one direction thereof.

5. In a cam body making machine, a frame, a forming horn fixed at one end thereof to said frame, an elongated anvil fixed to said frame and disposed adjacent said forming horn longitudinally thereof, a horn support fixed to said frame and spaced longitudinally from said one end of said horn and disposed adjacent said forming horn on the side thereof opposite to said anvil, an aligned pair of clamp cheeks mounted longitudinally in said forming horn for radial movement into and out of clamping engagement with said anvil, a horn support engaging member mounted in said forming horn for radial movement therein into and out of engagement with said horn support, a rod mounted longitudinally in said forming horn for reciprocal movement therein, cam surfaces on said rod adjacent said clamp cheeks and said horn support engaging member, cam means engageable by said cam surfaces for forcing said clamp cheeks and said horn support engaging member outwardly into engagement with said anvil and horn support when said rod is moved longitudinally in one direction thereof and for permitting inward movement of said clamp cheeks and horn support engaging member when said rod is moved back in the opposite direction.

References Cited in the file of this patent
UNITED STATES PATENTS

| | | |
|---|---|---|
| 704,700 | Hodgson | July 15, 1902 |
| 1,719,720 | Olsen | July 2, 1929 |
| 2,206,795 | Weber | July 2, 1940 |
| 2,652,801 | Laxo | Sept. 22, 1953 |